United States Patent
Deixler et al.

(10) Patent No.: US 12,253,478 B2
(45) Date of Patent: Mar. 18, 2025

(54) WATER DETECTION DEVICE FOR DETECTING CHANGE IN AN AMOUNT OF WATER

(71) Applicant: SIGNIFY HOLDING B.V., Eindhoven (NL)

(72) Inventors: Peter Deixler, Arlington, MA (US); Hugo José Krajnc, Eindhoven (NL); Harry Broers, 'S-Hertogenbosch (NL); Willem Dirk Van Driel, 'S-Hertogenbosch (NL)

(*) Notice: Subject to any disclaimer, the term of this patent is extended or adjusted under 35 U.S.C. 154(b) by 134 days.

(21) Appl. No.: 18/016,005

(22) PCT Filed: Jul. 8, 2021

(86) PCT No.: PCT/EP2021/069033
§ 371 (c)(1),
(2) Date: Jan. 13, 2023

(87) PCT Pub. No.: WO2022/013065
PCT Pub. Date: Jan. 20, 2022

(65) Prior Publication Data
US 2023/0258579 A1    Aug. 17, 2023

Related U.S. Application Data

(60) Provisional application No. 63/052,660, filed on Jul. 16, 2020.

(30) Foreign Application Priority Data

Jul. 23, 2020   (EP) ..................................... 20187344

(51) Int. Cl.
*G01N 22/04*    (2006.01)
*F21V 15/01*    (2006.01)
*H05B 47/19*    (2020.01)

(52) U.S. Cl.
CPC ............. *G01N 22/04* (2013.01); *F21V 15/01* (2013.01); *H05B 47/19* (2020.01)

(58) Field of Classification Search
CPC .......... F21V 15/01; G01N 22/04; H04B 1/16; H05B 47/105; H05B 47/19
See application file for complete search history.

(56) References Cited

U.S. PATENT DOCUMENTS 6,849,046 B1 *   2/2005   Eyal-Bickels ....... A61B 5/0535
                                                   600/430
9,863,989 B1     1/2018   Tam et al.
                          (Continued)

FOREIGN PATENT DOCUMENTS

CN         106402754 A      2/2017
JP      WO2019044253 A1     4/2020
                          (Continued)

*Primary Examiner* — Jay Patidar

(57) ABSTRACT

The invention is directed to a water-detection device (100) for detecting a change in an amount of water (W) with respect to a baseline-condition. The water-detection device is configured to compare signal-quality values to baseline-values. The signal-quality values are indicative of a signal-quality metric that is correlated to the amount of water present in a signal-propagation path (S). The baseline-values are indicative of the signal-quality value obtained from the radio-frequency wireless communication signal at the baseline-condition. The water-detection device is configured to provide a water-detected signal (WD) indicative of a possible change of the amount water in the respective signal-propagation path upon determining that respective signal-quality value has been outside a tolerance-range of the baseline-value for a predetermined amount span, without the need of any dedicated water sensor.

16 Claims, 8 Drawing Sheets

(56) References Cited

U.S. PATENT DOCUMENTS

2003/0146767 A1  8/2003  Steele et al.
2010/0071460 A1  3/2010  Fleischer et al.
2011/0304268 A1  12/2011 Bertram et al.

FOREIGN PATENT DOCUMENTS

KR   20200000668 A   1/2020
WO   2020089136 A1   5/2020

* cited by examiner

WATER DETECTION DEVICE FOR DETECTING CHANGE IN AN AMOUNT OF WATER

CROSS-REFERENCE TO PRIOR APPLICATIONS

This application is the U.S. National Phase application under 35 U.S.C. § 371 of International Application No. PCT/EP2021/069033, filed on Jul. 8, 2021, which claims the benefit of U.S. Provisional Patent Application No. 63/052,660, filed on Jul. 16, 2020, and European Patent Application No. 20187344.5, filed on Jul. 23, 2020. These applications are hereby incorporated by reference herein.

FIELD OF THE INVENTION

The present invention is directed to a water-detection device, to a wirelessly controllable luminaire, to a lighting arrangement, to a method for operating a water-detection device, to a method for determining water-ingress in a wirelessly controllable luminaire of a lighting arrangement, to a method for determining water-ingress in a wirelessly controllable luminaire, and to a computer program.

BACKGROUND OF THE INVENTION

US 2011/0304268 A1 describes a lighting device comprising a light source and a sensor such as a humidity sensor for protecting the lighting device, in particular the light source, from water ingress.

SUMMARY OF THE INVENTION

It would be beneficial to provide a simplified hardware solution for detecting water in a device.

According to a first aspect of the present invention, a water-detection device is described. The water-detection device is suitable for detecting a change in an amount of water, in a gas phase, or in a liquid phase or in a combination of gas and liquid phase, with respect to a baseline-condition. The water detection device comprises a receiver unit for receiving radio-frequency wireless communication signals from at least one external emitter unit in accordance with a predetermined wireless communication protocol. The water-detection device also includes a signal-quality determination unit that is connected to the receiver unit. The signal-quality determination unit is configured to determine and store respective signal-quality values associated to the at least one external emitter unit. The signal-quality value is a value that is correlated to an amount of water present in a signal-propagation path between the emitter unit and the receiver unit.

The water-detection device also comprises a baseline-value determination unit that is configured, in response to a reception of a trigger signal, to determine and to store a respective baseline-value. The baseline-value is indicative of the signal-quality value obtained from the radio-frequency wireless communication signal provided by the respective external emitter in the baseline-condition.

Further, the water-detection device comprises a water-detection unit connected to the signal-quality determination unit and to the baseline-value determination unit. The water-detection unit is configured to compare the signal quality values obtained from the wireless communication signals provided by a given external emitter unit with the corresponding baseline-value determined from the radio-frequency wireless communication signal provided by the emitter unit. The water-detection unit is further configured to provide a respective water-detected signal upon determining that the respective signal-quality value has been outside a predetermined tolerance-range of the baseline value for at least a predetermined amount of time. The baseline-value is therefore a reference value with which the signal-quality value is compared. The water-detected signal is thereby indicative of a possible increase of the amount water in the respective signal-propagation path with respect to the amount of water content present in the baseline-condition.

The water-detection device therefore compares a signal-quality value with a stored baseline-value to infer the presence of water in the signal propagation path.

The water-detection unit is configured to provide the water-detection signal for a given emitter or communication link when the determined signal-quality value associated to said emitter or communication link has been outside the tolerance-range associated to the respective baseline-value for at least a predetermined amount of time. The water-detection signal is, in the general case, an indication that the amount of water along the signal-propagation path has increased or decreased with respect to the amount of water in the baseline-condition. A sensitivity of the provision of the water-detected signal, i.e. how much the current or recent quality-signal values have to change with respect to the baseline-value to trigger the provision of the water-detected signal depends on the particular choice of the tolerance-range and the water-determination time span.

The advantageous use of signal-quality values thus provides an alternative for water-increase detection without the need of a dedicated humidity sensor, thus reducing the hardware complexity of the devices.

In the following, embodiments of the water-detection device of the first aspect of the present invention will be described.

In an embodiment, the determined signal-quality value is indicative of a signal strength of the wireless communication signals. The received signal strength indicator (RSSI) is defined as an estimated measure of power level present in the radio-frequency wireless signal received by a radio-frequency (RF) client device. Alternatively, or additionally, in another embodiment, the determined signal quality-value is indicative of a channel-state of a respective wireless communication link between the at least one external emitter unit and the receiver unit. Channel state indicator (CSI) refers to known channel properties of a wireless communication link and is indicative of how a wireless communication signal propagates between the emitter unit and the receiver unit. It represents the combined effect of, for example, scattering, damping, fading, and power decay with distance. Further, in another embodiment, the signal-quality value is additionally or alternatively indicative of another suitable signal quality metric, such as, but not limited to a number of retries needed to provide a message or to a number of missed messages or to a number of errors in the messages.

In an embodiment, the baseline-value determination unit is configured, in response to the reception of the trigger signal to monitor the signal-quality values determined during a predetermined baseline-determination time span and to determine the baseline-quality value as a statistical-value associated to the monitored signal-quality values. In a preferred embodiment, the statistical-value associated is an average value. In other embodiments, a median value, a mode value or other suitable statistical values are used. It is preferred to provide the trigger signal when the one or more external emitters and the water-detection device are in so-called dry conditions, or normal operation conditions.

The signature or effect of water accumulation between the emitter unit and the water-detection device on the signal-quality value is different than that of an object moving between the emitter unit and the water detection device, which typically results in a sudden change—usually a drop—of the signal-quality value followed by a recovery towards the original value once the object is no longer blocking the radio frequency wireless communication signal. Therefore, the predetermined water-determination time span is chosen to differentiate the possible causes of the change in the signal-quality value. In an embodiment, the water-determination time span is between 1 and 10 hours, in another embodiment, the water-determination time span is between 1 and 60 minutes, and in another embodiment, the water-determination time span is between 5 and 60 seconds. A water-determination time span in the order of one to ten minutes is particularly suitable for detecting water ingress in the emitter unit or in the water-detection unit due to water dripping inside a housing and interfering with the propagation of the radio-frequency wireless communication signals. A water-determination time span in the order of 1 to 2 hours is particularly suitable for detecting condensation due to for example slowly dropping temperatures. The particular choice of the water-determination time span depends on a particular environment and/or on an operation condition state. For instance, if water-ingress determination is required to be performed before a certain point in time, the water-determination time span is suitably selected so that the baseline-value determination takes place before the water-ingress determination starts.

A movement of an object or subject crossing the signal-propagation path between the external emitter unit and the receiver unit may also have an effect on the signal-quality value. However, the time signature of these effects are different, especially if water has accumulated in the signal-propagation path between the emitter unit and the receiver unit. Accumulated water has an impact on the signal-quality value that lasts a longer time than in the case of an object crossing the signal-propagation path. Thereby, depending on an expected environment, i.e. whether movement across the respective signal-propagation paths is expected, the suitable water-determination time-span is selected.

In an embodiment, the tolerance-range is symmetric with respect to the baseline-value The tolerance-range is, in an embodiment, 10% of the baseline-value, so that any signal-quality values below 90% or above 110% of the baseline-value trigger the provision of the water-detected signal, if the determined signal-quality values remain outside this tolerance-range for the predetermined water-detection time span. In alternative embodiments, the tolerance-range 20%, or 30%, or 40%, or 50%, or 60%, or 70%, or 80% or 90% of the baseline-value, depending on a change of the amount of water that needs to occur before providing the water-detected signal. Larger tolerance-ranges are associated with larger changes in the amount of water.

In an alternative embodiment, the tolerance-range is not symmetric with respect to the baseline-value. In yet another embodiment, the baseline-value is an upper or a lower boundary of the tolerance-range.

In another embodiment, the tolerance-range is a 3 dB loss and/or increase in signal-quality value, such as RSSI. In another embodiment, the tolerance range is 5 dB, or 10 dB or 15 dB or 20 dB loss and/or increase in the signal-quality value. Losses higher than 20 dB are to be interpreted as a total collapse of transmission or reception of the radio-frequency wireless communication signal.

The particular choice of the tolerance-range depends on an intended use of the water detection device as well as on expected fluctuation-level of the signal-quality value. Preferably, the tolerance-range is larger than the fluctuations of the signal-quality value expected during normal operation. The larger the tolerance-range the less sensitive the water-detection device is, i.e. more change of the water amount is needed to trigger the provision of the water-detected signal. On the other hand, larger tolerance-ranges are associated to more robust water-detection devices, that are less likely to react to fluctuations that could otherwise result in a false-positive result, i.e., provision of the water-detected signal when no change in the water amount has occurred. For example, external emitter units whose operation is more sensitive to water ingress are preferably associated to smaller tolerance-ranges, such as 1 dB-3 dB or 20%-50%, of the respective baseline-value.

In an embodiment, when the water-detection unit determines that the signal-quality values are higher than the corresponding baseline value by a predetermined amount and during a predetermined time span, it is configured to provide the trigger signal to the baseline-value determination unit so that a new baseline-value is determined and stored, preferably overwriting the previous baseline-value. This is especially advantageous, when the preceding baseline-value is determined when an excessive amount of water is present along the signal-propagation path that evaporates with time.

In an embodiment, the water-detected signal is a flag signal indicative of a possible occurrence of water accumulation or ingress with respect to the baseline-value. In another embodiment, the water-detected signal also includes data indicative of the current value of the signal-quality value and, optionally, also of the corresponding baseline value.

In one embodiment, the water-detection unit is configured to provide the respective water-detected signal upon determining that the respective signal-quality value has been below the baseline-value for the predetermined water-determination time span. In another embodiment, the water-detected signal is provided upon determining that the signal-quality value has been below a given percentage of the baseline-value, e.g. 90% or 80% or 70% or 60% or 50%.

In another embodiment, which can include any combination of the features described above with respect to the previous embodiments, the receiver unit is configured to receive radio-frequency wireless communication signals with signal frequency values between 1 and 100 GHz. In a particular embodiment, the radio-frequency communication signals are sent in accordance with a predetermined wireless communication protocol with frequency values between 2 GHz and 6 GHz. Examples of such wireless communication protocols include, but are not limited to, IEEE 802.15.4, commonly referred to as Zigbee, and IEEE 802.11, commonly referred to as WiFi, and typically operating in a 2.4 GHz and a 5 GHz frequency band. In another embodiment, the radio-frequency communication signals are sent in accordance with another predetermined wireless communication protocol with frequency values between 50 and 100 GHz.

A surface may be present in the spatial volume of the wireless signal propagation path between the transmitting wireless node to the receiving wireless node. The inventors have realized that, when there is an accumulation of water along the signal-propagation path, a change in the metrics used for water detection, for instance, the received signal strength indicator (RSSI), and/or the channel state indicator (CSI), show behaviors that are indicative of different slow frequencies in terms of variation of the signal-quality values. For instance, in the presence of dry surfaces RSSI values in a time domain show randomly distributed peak-to-peak values whereas in the presence of wet surfaces RSSI values in the time domain peak-to-peak values having predetermined frequency patterns, such as, for example, sinusoidal peak-to-peak values over time, having a frequency, typically below 50 Hz. Therefore, in an embodiment in accordance with the first aspect of the invention, the signal-quality evaluation unit further comprises a frequency-evaluation unit that is configured to determine a respective transform in a frequency domain of a sequence of received signal-quality values and to determine, in the transform of the sequence of signal-quality values, an occurrence of a predetermined frequency-pattern in a frequency band below 50 Hz, preferably below 10 Hz and more preferably below 5 Hz. The water-detection unit is configured to provide the water-detected signal in further dependence on the occurrence of the predetermined frequency pattern. The further use of the frequency domain analysis for providing the water-detected signal increases the confidence of the water-detection.

A second aspect of the present invention is formed by a wirelessly controllable luminaire which comprises a lighting unit, configured to receive electrical power and to emit light for illumination in dependence on operation instructions received via radio-frequency wireless communication signals in accordance with a predetermined wireless communication protocol. The luminaire also comprises an emitter unit for providing radio-frequency wireless communication signals for communication with other devices. The luminaire comprises a housing having a water-collection region for collecting water inside the luminaire due to water ingress in the luminaire. The luminaire also comprises a water-detection device in accordance with the first aspect of the invention.

The wirelessly controllable luminaire of the second aspect of the invention thus shares the advantages of the water-detection device of the first aspect and of any of its embodiments.

In the following, embodiments of the wirelessly controllable luminaire of the second aspect are described.

The water-collection region is that region where water, either condensed inside or leaked into the luminaire is collected, typically by gravity. In an embodiment, a sinkhole is formed in the housing to collect the moisture within the luminaire. In another embodiment, a cold-spot condensation surface is included in the housing of the luminaire in such a way to ensure that water accumulation first occurs in a part of the luminaire that affects the signal-quality value and preferably affects operation of the luminaire the least possible. When the temperature inside the luminaire drops fast, the relative humidity of the inside the housing increases if the water vapor inside cannot be exchanged fast enough with the environment outside the luminaire. Depending on the total volume delimited by the housing, and the experienced temperature drop, condensation inside the luminaire occurs. The condensation takes places on the surfaces with the lowest temperature first, which is usually that part of the housing in direct contact with the ambient or the bottom of a heat sink. Condensation at cold surfaces mostly results in water dripping and forming puddles in the water-collecting region.

In an embodiment, the emitter unit or the receiver unit, or both the emitter and the receiver unit, forming part of a single transceiver unit, are arranged within the luminaire at a position such that the radio-frequency wireless communication signals provided or received are significantly affected by cold-spot condensation or by water collection inside the luminaire. For instance, if condensation is expected to occur first on a specific cold-spot condensation surface, such as an optical exit window, the emitter unit, or the receiver unit, or the transceiver unit are arranged such that a radio-frequency signal-propagation path covers a portion of the cold-spot condensation surface. Additionally, in an embodiment, the luminaire is advantageously designed so that condensation occurs at a place in an immediate vicinity of the emitter unit, the receiver unit or the transceiver unit. Alternatively, in an embodiment, an antenna of the emitter or the receiver unit is arranged in the immediate vicinity of a coldest spot of the luminaire, e.g. by using wire antennas, track antennas integrated in printed circuit boards, etc.

In a particular embodiment, that is suitable for determining water-ingress inside the luminaire, the water-collection region is positioned in a signal-propagation path of the wireless communication signals provided by the emitter unit and received by the receiver unit. In an embodiment, the emitter unit and/or the receiver unit are a transceiver unit configured to provide and receive radio-frequency wireless communication signals. In these embodiments, radio-frequency based water-detection is performed between the emitter unit and the receiver unit arranged at opposite sides of the water-collection region. In a particular embodiment, the luminaire comprises two Zhaga sockets, for example at the top and the bottom of the fixture wherein an emitter unit and a receiver unit, or two transceiver units are connected. The location of the Zhaga sockets and, therefore, of the emitter and the receiver unit are designed such that the radio-frequency transmission of the radio-frequency wireless communication signals between the upper and the lower communication modules, i.e., the emitter and the receiver, passes through the water-collection region, such as a condensation surface or a sinkhole for collecting water.

This embodiment is advantageously configured to determine whether water has accumulated in the water-collection region. Preferably, the water-detected signal is provided to a luminaire control unit, which is configured to control operation of the lighting unit in dependence on the water-detected signal. For instance, the luminaire control unit is configured to trigger circuit breakers to proactively depower the luminaire before a water-related safety incident occurs.

In an embodiment, upon determining a water ingress event, the water-detected signal is provided to a risk-assessment unit configured to monitor an evolution of the water-ingress in the luminaire, based for instance on an average value of the determined signal-quality value at consecutive time windows. This allows a determination of a progression speed of water accumulation in the luminaire. A user output data indicative of the luminaire affected by the water ingress is provided by the risk-assessment unit.

In another embodiment, the emitter unit and the receiver unit are integrated into a single transceiver unit that is arranged so that a maximum value of a radiation pattern of the transceiver unit is directed towards the water-collection region. This is particularly advantageous for use in a lighting arrangement with a plurality of wirelessly controllable luminaires as it is described below with respect to a third aspect of the invention.

In another embodiment, the luminaire includes an external outdoor lighting controller (OLC). The external OLC uses a cellular radio combined with a SiLabs dual ZigBee/BLE radio or, alternatively a Zigbee only radio. For luminaires with a plastic housing, the wireless signals transmitted by the OLC can easily penetrate the inside of the luminaire; hence accumulated water will influence the wireless multipath signals. For instance, the CSI path from the OLC through the luminaire to the floor will be significantly altered by the accumulated water. For luminaires having housings including metal parts, the impact will depend on how much of the radio signal manages to reach the accumulated water (and not already first reflected by the metal exterior housing of the luminaire). In this case, the luminaire hardware is designed to let some of radio signals pass from the OLC, which is mounted externally to the housing, into the luminaire cavity.

In a particular embodiment, the water-collection region of the wirelessly controllable luminaire comprises a water-absorbing material. Whenever there is excessive moisture inside the luminaire, the water-absorbing material absorbs the excess moisture. The resulting changes in the water-absorbing material affect the signal-quality values determined by the water-detection device. Optionally, in another embodiment, the water-absorbing material is coated with or otherwise includes metal particles to maximize its interaction with the radio-frequency wireless communication signal when it absorbs water and expands.

A third aspect of the present invention is formed by a lighting arrangement configured to detect water-ingress within luminaires forming the lighting arrangement. The lighting arrangement comprises a plurality of wirelessly controllable luminaires configured to receive and provide radio-frequency wireless communication signals for communication with the other luminaires of the lighting arrangement in accordance with a predetermined communication protocol. The lighting arrangement of the third aspect also includes at least one water-detection device as described with respect to the first aspect and therefore shares its advantages.

In the following, embodiments of the lighting arrangement of the third aspect are described.

In an embodiment, a water-detection device is included in one or more of the luminaires, in particular all of the luminaires. These luminaires including the water-detection device are thus in accordance with the second aspect of the invention.

Under operation, the water-detection device is configured to determine and store baseline-values indicative of signal-quality values preferably obtained at dry conditions, i.e., without water ingress in the luminaires. A baseline-value is preferably determined and stored for every emitter unit proving radio-frequency wireless communication signals that are received by the receiver unit.

In a particular embodiment of a lighting arrangement including Internet of Things-based or connected luminaires, the baseline-value is stored by a lighting arrangement management system or a cloud-based service. In an embodiment this is performed by doing a direct comparison with neighboring luminaires that are exposed to similar conditions. For instance, in the case of a rainy day, this would influence the communication signals in a substantially similar way. In another embodiment, periods of time with similar environmental conditions are found via, for example, weather services. The signal-quality values determined during these periods of time are then used for baseline-value determination.

As the immediate surroundings of the luminaires, especially high-bay luminaires or street lights, are typically fairly constant, any deviation in the determined signal-quality value associated to a particular emitter is considered a reliable indicator that condensation or water ingress has occurred within either the luminaire comprising the emitter or the water-detection device. Whenever a water ingress event occurs, either condensation or water leakage inside the luminaire, the wireless multipath signal within the luminaire is significantly altered, in comparison with a dry-state baseline-value. As the wireless signal-propagation paths are altered, also the wireless beams emitted to the outside of the transmitting luminaire are affected, which causes observable differences in the signal-quality values determined from the wireless communication signals provided by the emitter unit of the luminaire suffering from water ingress. An evaluation of the signal-quality values associated to multiple luminaires is therefore advantageous to determine in which luminaire water is accumulating.

In a particular embodiment, the wirelessly controllable luminaires are closely spaced such that the wireless communication signals provided by a given luminaire are received by more luminaires than the adjacent luminaires. Since water accumulation also affects a wireless signal-propagation path of any radio-frequency communication passively passing through a target-luminaire, a presence of water can be detected by performing RF sensing with two luminaires being adjacent to the target luminaire. The detection of water is then performed by the two adjacent luminaires while the target luminaire does not actively participate in the water-determination process.

In another embodiment of the lighting arrangement of the third aspect, the emitter units are configured to provide water-sensing specific radio-frequency wireless communication signals having a higher frequency value range than the radio-frequency wireless communication signals used for operating the lighting arrangement. Since attenuation of radio-frequency wireless signals due to hydrometeors such as water increases with increasing transmission frequency of the wireless signals, the emitter unit is configured to provide water-sensing specific radio-frequency wireless communication signals at a higher frequency range than the signals provided for communication purposes. For instance, in a lighting arrangement configured to communicate in accordance with an IEEE 802.15.4 communication protocol, the emitter units are configured to provide wireless communication signals for communication with other luminaires, in particular for operation and status-communication purposes at a frequency band of 2.4 GHz. The emitter unit is also configured to provide the water-sensing specific radio-frequency wireless communication signals at a higher frequency band of 5 GHz. Since water ingress typically occurs slowly, the emitter configured to alternate between communication messages in the lower frequency band, interleafed with RF-sensing specific messages sent at a higher, preferably the highest possible frequency.

In an embodiment, the wirelessly controllable luminaire comprises a multi frequency band antenna. The luminaire is advantageously configured to provide wireless communication signals for communicating with other devices in a first frequency band less affected by water presence. For diagnostic purposes, the luminaire is configured to switch to a second frequency band more affected by water presence than the first frequency band. A relative comparison of the signal-quality values thus gives insight with respect to water ingress.

In another embodiment, the lighting arrangement further comprises a water-ingress control unit that is configured to receive from the one or more water-detection devices the respective water-detected signals indicative of the possible increase of the water amount in the respective signal-propagation path between the emitter unit and the receiver unit and to determine, using the water-detected signals, a likelihood of water-ingress in the respective luminaires and to provide a water-ingress signal indicative thereof.

In an embodiment the water-ingress control unit is configured to inform a user of the water ingress problem by causing a predefined light effect on one of the luminaires, preferably that luminaire suffering from water-ingress. Additionally, if the water ingress is deemed a safety hazard, or alternatively, the water-ingress signal is provided to a luminaire control unit of the luminaire assumed to be suffering from water-ingress, which is configured to control operation of the lighting unit in dependence on a reception of the water-ingress signal. For instance, the luminaire control unit is configured to trigger circuit breakers to proactively depower the luminaire before a water-related safety incident occurs, optionally informing a lighting control cloud backend about the failure mode or consulting with the cloud backend whether or not to switch the light off.

According to a fourth aspect of the present invention, a method for operating a water-detection device is described. The method comprises:
    receiving radio-frequency wireless communication signals from at least one emitter unit in accordance with a predetermined wireless communication protocol;
    determining and storing respective signal-quality values, in particular indicative of a signal strength of the wireless communication signals or of a channel-state of a respective wireless communication link between the at least one emitter unit and the receiver unit, or of any other suitable signal-quality metric, wherein the signal-quality value is correlated to an amount of water present in a signal-propagation path of the radio-frequency wireless communication signal;
    in response to a reception of a trigger signal, determining and storing a respective baseline-value indicative of the signal-quality value obtained from the radio frequency wireless communication signal provided by the respective emitter unit;
    comparing the signal quality values with the corresponding baseline-value;
    providing a respective water-detected signal upon determining that the respective signal-quality value has been outside a predetermined tolerance-range for at least a predetermined amount of time, the water-detected signal being indicative of a possible increase or decrease of the amount water content in the respective signal-propagation path with respect to the amount of water content during the determination of the baseline-value.

The method of the first aspect thus shares the advantages of the water-detection device of the first aspect of the invention or of any of its embodiments.
In a particular embodiment, the method comprises:
    determining a respective transform in a frequency domain of a sequence of received signal-quality values;
    determining, in the transform of the sequence of signal-quality value, an occurrence of a predetermined frequency-pattern in a frequency band below 50 Hz, preferably below 10 Hz and more preferably below 5 Hz; and
    providing the water-detected signal in further dependence on the occurrence of the predetermined frequency pattern.

A fifth aspect of the present invention is formed by a method for determining water-ingress in a wirelessly controllable luminaire of a lighting arrangement. The method comprises
    providing radio-frequency wireless communication signals by an emitter unit of a first luminaire;
    performing, at a water-detection device external to the first luminaire, the method of the fourth aspect of the present invention.

A sixth aspect of the invention is formed by a method for determining water-ingress in a wirelessly controllable luminaire having an emitter unit, a receiver unit and a housing having a water-collection region positioned in a signal-propagation path between the emitter unit and the receiver unit. The method comprising:
    providing, by the emitter unit of the luminaire, radio-frequency wireless communication signals; and
    performing a method in accordance with the fourth aspect of the invention.

A seventh aspect is formed by a computer program comprising instructions which, when the program is executed by a computer, cause the computer to carry out a method in accordance with the fourth aspect.

It shall be understood that the water detection device of claim 1, the wirelessly controllable luminaire of claim 4, the lighting arrangement of claim 7, the method for operating a water-detection device of claim 11, the method for determining water-ingress in a wirelessly controllable luminaire of a lighting arrangement of claim 13, the method for determining water-ingress in a wirelessly controllable luminaire of claim 14, and the computer program of claim 15, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Figure 1:
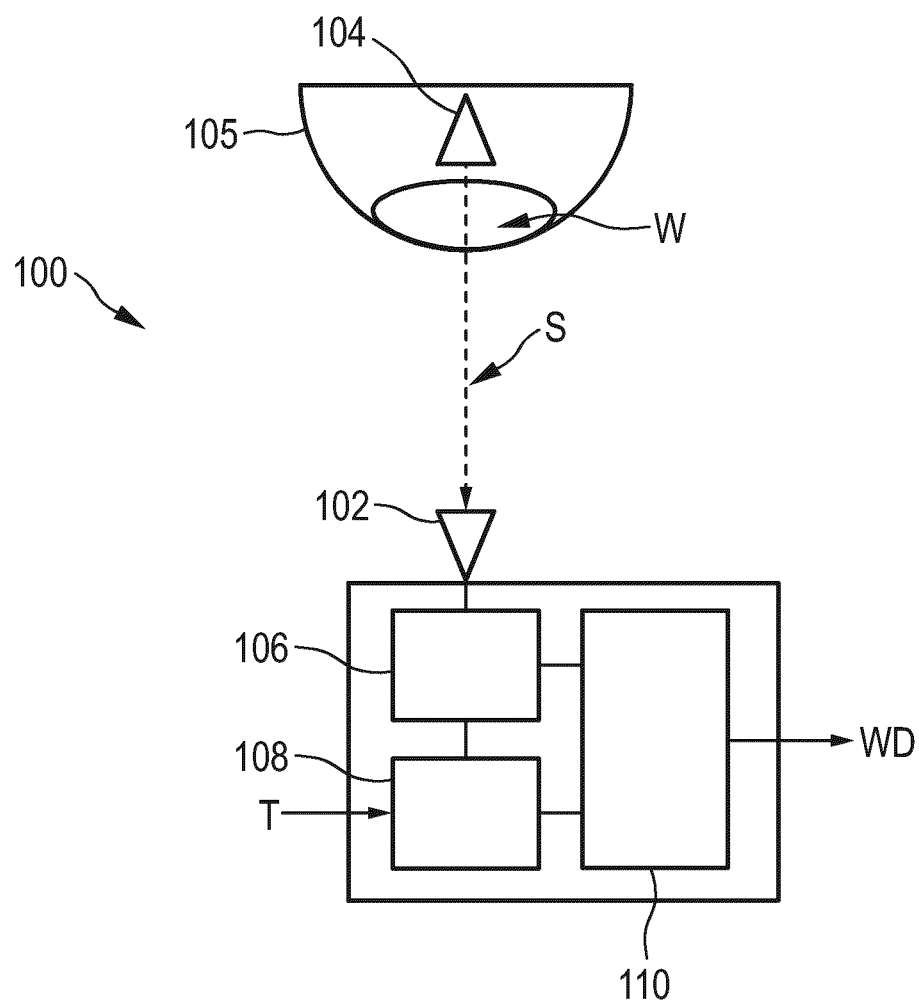
FIG. 1 shows a schematic block diagram of an embodiment of a water-detection device receiving radio-frequency wireless communication signals from an external emitter of a luminaire.

FIG. 1 shows a schematic block diagram of an exemplary water-detection device 100 that is receiving radio-frequency wireless communication signals S from an emitter 104 of a luminaire 105, such as a high bay luminaire or a street light, that is wirelessly controllable. The water-detection device 100 is suitable for detecting an increase or a decrease in an amount of water by using radio-frequency (RF) sensing techniques, as it is explained in the following. The water to be detected can be in a gas phase, a liquid phase or in a combination of both the gas and the liquid phase.

The water-detection device comprises a receiver unit 102 that is configured to receive radio-frequency wireless communication signals S from external emitter units, such as emitter unit 104, in accordance with a predetermined wireless communication protocol. Suitable wireless communication protocols include, but are not limited to, Zigbee, Bluetooth, Low energy Bluetooth, Thread, and WiFi. Typically, RF wireless communication signals are provided within a frequency range between 1 and 100 GHz, where water has an stronger impact in the transmission of the signals due to absorption, when compared, for instance, with signals in the visible wavelength region. As an example, WiFi signals transmitted in the 60 GHz band have a wavelength of around 5 mm, which corresponds to a water absorption coefficient of approximately $10^4$ l/m. In some cases, accumulated water in the luminaire is dirty or soiled, which leads to a further increase of absorption of the wireless signals. However, water accumulation does not necessarily lower the signal quality value. For example the presence of water leads to an alteration of the wireless multipath between the two nodes such that e.g. through refection at the water surface, there is more wireless energy arriving at the receiver, and thus a higher received signal strength.

A signal-quality determination unit 106 is connected to the receiver unit and configured to determine and store respective signal-quality values, for example indicative of a signal strength (RSSI) of the wireless communication signal S or of a channel-state (CSI) of a respective wireless communication link between the emitter 104 unit and the receiver unit 102, or of any other suitable signal-quality metric that can be affected by water. The signal-quality value is therefore correlated to an amount of water W present in a signal-propagation path between the emitter unit 104 and the receiver unit 102.

A baseline-value determination unit 108 is configured, in response to a reception of a trigger signal T, to determine and to store a respective baseline-value indicative of the signal-quality value obtained from the radio-frequency wireless communication signal S provided by the emitter unit 104 in a so-called baseline-condition.

The water-detection device 100 comprises a water-detection unit 110 that is connected to the signal-quality determination unit 106 and to the baseline-value determination unit 108. The water-detection unit is configured to compare the signal-quality values determined by the signal-quality determination unit with the corresponding baseline-value determined in the baseline-condition. The water-detection unit is configured to provide a water-detected signal WD upon determining that the respective signal-quality value has been outside a predetermined tolerance-range for at least a predetermined water-determination time span, the water-detected signal being indicative of a possible increase of the amount water content in the respective signal-propagation path with respect to the amount of water content during the determination of the baseline-value. The tolerance-range is in a particular example 20% of the baseline-value, so that if signal-quality values below 80% or above 120% of the baseline-value are detected for the predetermined water-detected time span, the water-detected signal is provided. In other exemplary water-detection device, the tolerance-range is not symmetric with respect to the baseline-value. In yet another exemplary water detection device, the baseline-value is an upper or a lower boundary of the tolerance-range.

Under operation, preferably after installation of the luminaire 105, the trigger signal is provided, and a baseline-value is determined for the emitter 104 or for the wireless communication link between the emitter 104 and the receiver.

If, during operation, water W leaks inside the luminaire or condensates inside it, it will be collected, mainly via gravity, in a water-collection region of the luminaire. The emitter is advantageously positioned, such that a radiation pattern of the radio-frequency wireless-communication signals has a maximum oriented towards the water-collection region. The radiation pattern is also indicative of possible multipath propagation induced by the luminaire and not only to the radiation pattern of the antenna of the emitter itself. Part of the energy of the wireless communication signals provided by the emitter is be absorbed or scattered by the accumulated water and the determined signal-quality value, i.e., the RSSI or the CSI, decreases accordingly with time. When the signal-quality value has been outside the predetermined tolerance-range for the predetermined water-determination time span, the water-detected signal WD is provided. The provision of the water-detected signal is therefore indicative of a possible increase of the amount water in the respective signal-propagation path with respect to the amount of water in the baseline-condition.

The water-detection device 100 is also configured to receive radio-frequency wireless communication signals from a plurality of external emitter units. In a particular water-detection device, the reception of the trigger signal T causes the determination of the respective baseline-values, each associated to one of the external emitter units. Alternatively, the baseline-value determination unit 108 is configured to receive a dedicated trigger signal for a respective one or a sub-set of the emitter units.

The signal-quality determination unit 106 is configured to determine and store the signal-quality values from RF wireless communication signals provided by the respective emitter units. The water-detection unit 110 is thus configured to detect an increase of the amount of water for each of the emitter units or the wireless communication links between the respective emitter unit and the receiver unit 102 of the water-detection device 100.

Figure 2:
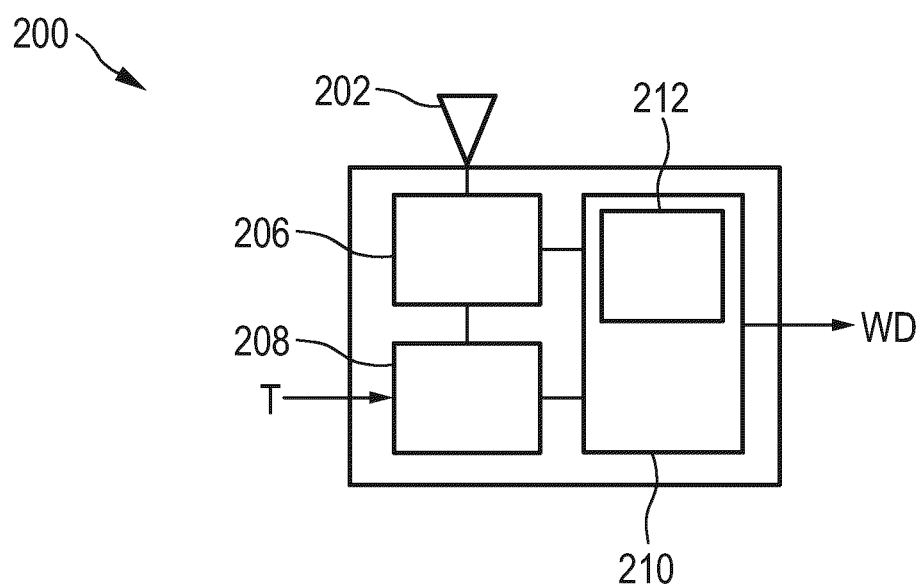
FIG. 2 shows a schematic block diagram of another embodiment of a water-detection device.

FIG. 2 shows a schematic block diagram of another embodiment of a water-detection device 200. The following description is focused on the differences between water-detection device 100 of FIG. 1 and water-detection device 200 of FIG. 2. Those technical features that are similar are referred to using the same numerals, except for the first digit, which is "1" for the water-detection device 100 and "2" for the water-detection device 200.

In the water-detection device 200, the water-detection unit 210 further comprises a frequency-evaluation unit 212. The frequency evaluation unit is configured to generate, using the received signal-quality values associated to the one or more emitter units, a respective sequence of signal-quality values in a time domain. The sequence is indicative of the changes of the signal-quality value with time, for a given time-span. The frequency-evaluation unit is also configured to determine a respective transform of the sequence of signal-quality values in a frequency domain and to determine, in the transform of the sequence of signal-quality value, an occurrence of a predetermined frequency-pattern in a frequency band below 50 Hz. For instance, the predetermined frequency-patters is the appearance of a sinusoidal peak-to-peak component within a predetermined frequency range between 2 and 5 Hz.

The water-detection unit 210 is configured to provide the water-detected signal WD in further dependence on the occurrence of the predetermined frequency pattern. Using a metric based on the signal-quality values in a time domain together with a metric based on a frequency analysis of those values further increases the confidence of water-detection.

Figure 3:
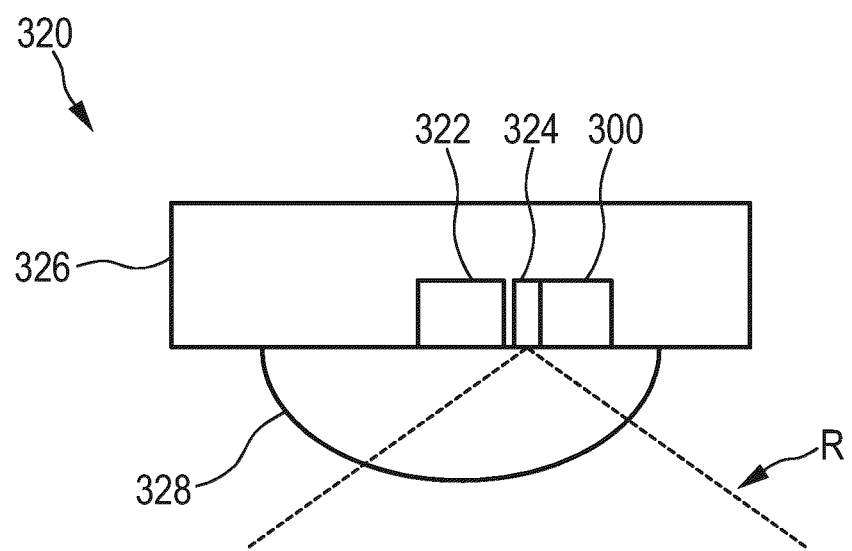
FIG. 3 shows a schematic block diagram of an embodiment of a wirelessly controllable luminaire.

FIG. 3 shows a schematic block diagram of an embodiment of a wirelessly controllable luminaire 330, which includes a water-detection unit 300 as described with reference to FIG. 1 or FIG. 2.

The wirelessly controllable luminaire 320 also comprises a lighting unit 322 that is configured to receive electrical power and to emit light for illumination in dependence on operation instructions received via radio-frequency wireless communication signals. The luminaire 320 also comprises an emitter unit for providing radio-frequency wireless communication signals for communication The operation and/or status of the wirelessly controllable luminaire 320 is controlled by providing instructions via a suitable wireless communication protocol such as, but not limited to Zigbee, Bluetooth, low-energy Bluetooth, Thread, or WiFi. The luminaire 320 also comprises a housing 326 that includes a water-collection region 328 for collecting water inside the luminaire. Water can accumulate inside the housing due to water ingress or condensation within the luminaire.

Suitably, but not necessarily, the water-collection region 328 and the emitter unit are arranged so that that a maximum value of a radiation pattern R of the emitter unit 324 is directed towards the water-collection region 328.

Figure 4:
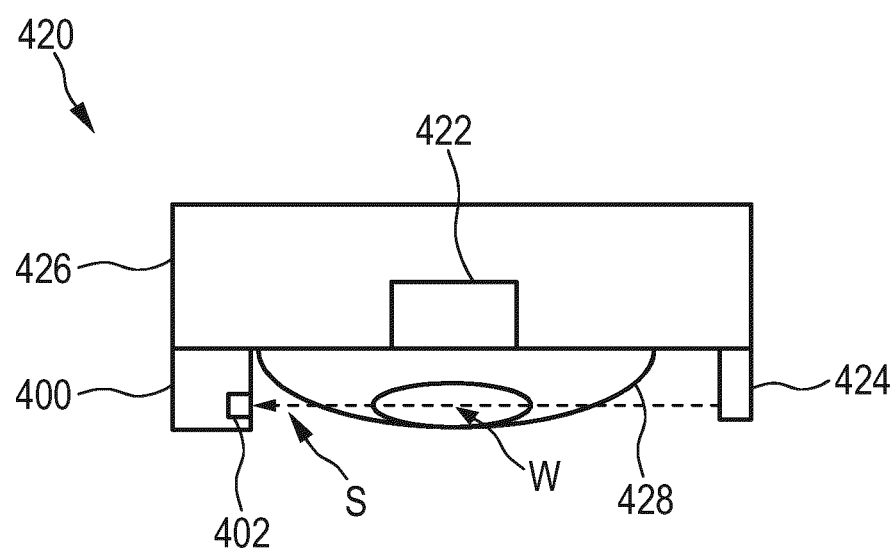
FIG. 4 shows a schematic block diagram of another embodiment of a wirelessly controllable luminaire.

FIG. 4 shows a schematic block diagram of another embodiment of a wirelessly controllable luminaire 420. The following description is focused on the differences between luminaire 320 of FIG. 3 and luminaire 420 of FIG. 4. Those technical features that are similar are referred to using the same numerals, except for the first digit, which is "3" for the luminaire 320 and "4" for the luminaire 200.

In the wirelessly controllable luminaire 420, the water-collection region 428 is positioned in a signal-propagation path of the wireless communication signals S provided by the emitter unit 424 and received by the receiver unit 402. This luminaire is therefore advantageously configured to determine whether water has accumulated in the water-collection region. Preferably, in this particular luminaire, the water-detected signal is provided to a luminaire control unit, which is configured to control operation of the lighting unit in dependence on the water-detected signal. For instance, the luminaire control unit is configured to trigger circuit breakers to proactively depower the luminaire before a water-related safety incident occurs.

Figure 5:
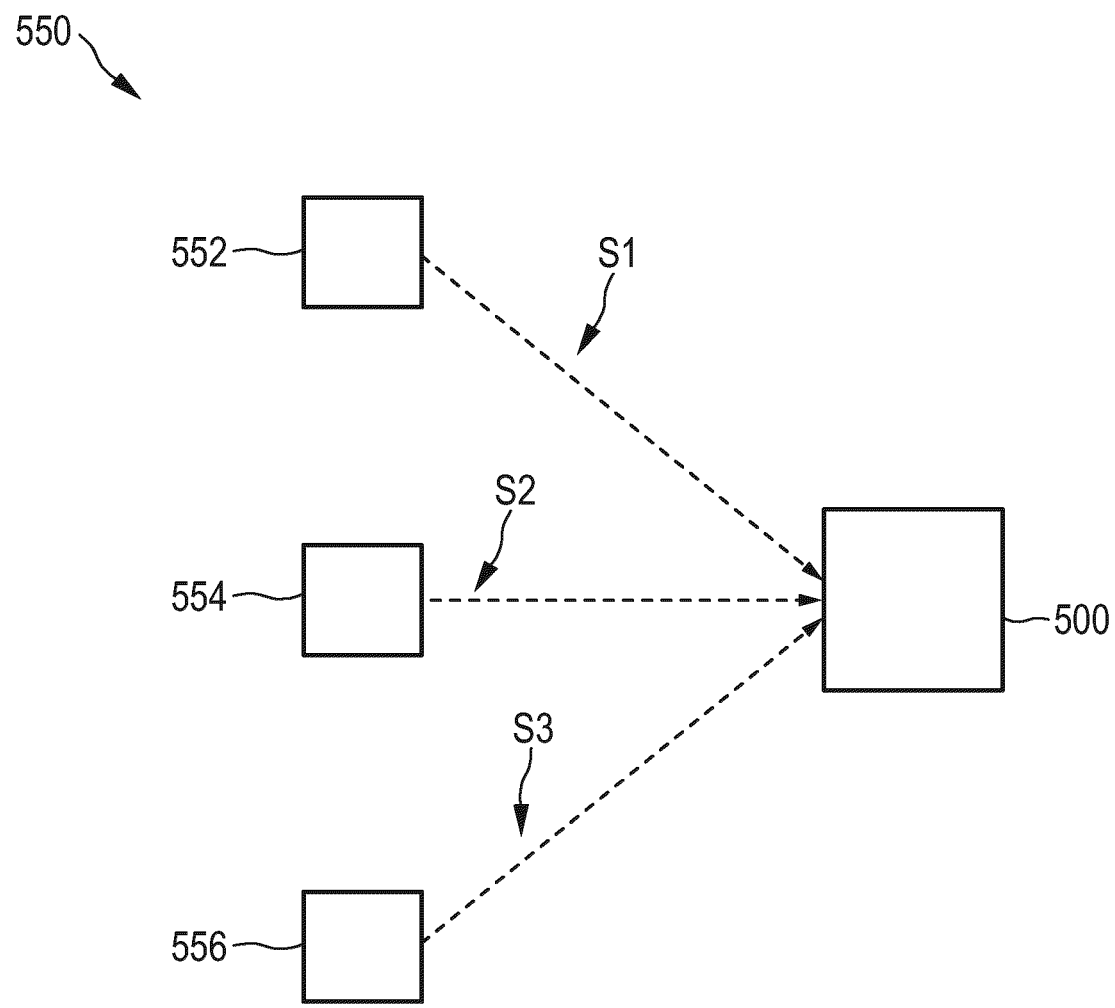
FIG. 5 shows a schematic block diagram of an embodiment of a lighting arrangement.

FIG. 5 shows a schematic block diagram of an embodiment of a lighting arrangement 550 comprising a plurality of wirelessly controllable luminaires 552, 554, and 556 as well as a water-detection device 500 external to the luminaires. The water-detection device is configured to determine and store, upon reception of one or more trigger signals, respective baseline-value indicative of the signal-quality value obtained from the radio-frequency wireless communication signal provided by the respective luminaires 552, 554, 556 at the baseline-condition. Also, it is configured to compare signal-quality values determined by the signal-quality determination unit and associated with a given luminaire with the corresponding baseline-value, and to provide a respective water-detected signal WD as described above with respect to FIG. 1. Alternatively, the water-detection device can be integrated in any one or more of the luminaires 552, 554 or 556.

Figure 6A:
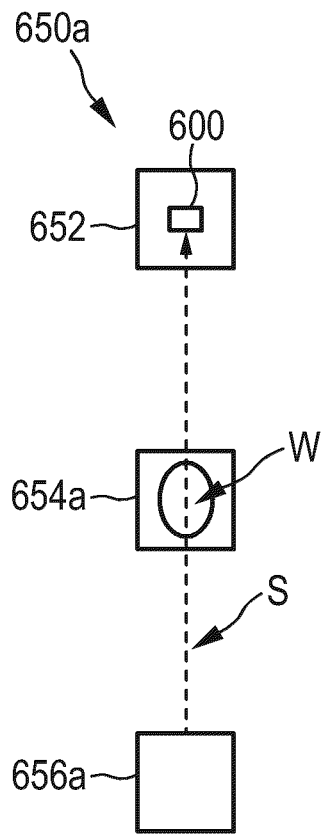
FIGS. 6A and 6B show schematic block diagrams of alternative embodiments of lighting arrangements.
Figure 6B:
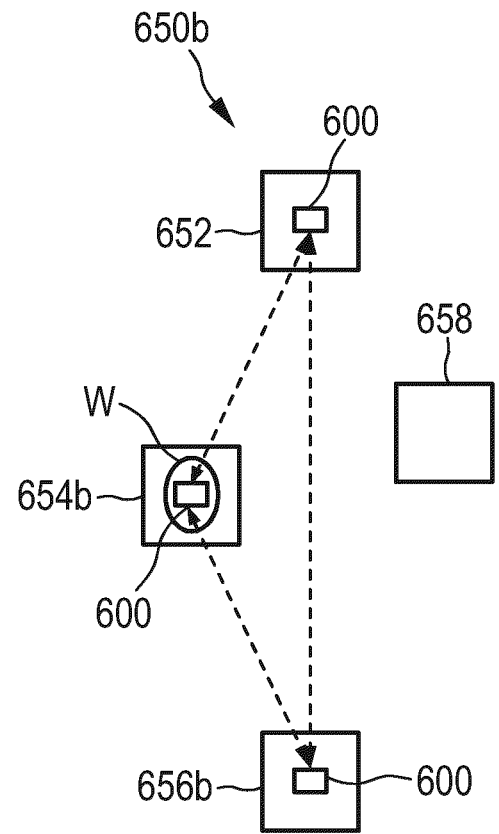

FIGS. 6A and 6B show schematic block diagrams of alternative embodiments of lighting arrangements 650a and 650b. For instance, lighting arrangement 650a is specially suitable for closely spaced luminaires 652, 654a, 656a, such as those used in horticulture. The lighting arrangement 650a is suitable for performing an RF-based water sensing function as described above using two luminaires 652, 656a to detect water ingress in a third luminaire 654a. Water W accumulated inside luminaire 654a also changes the wireless multipath of any radio-frequency wireless communication signals passively passing through the luminaire-Water ingress in luminaire 652, which does not necessarily have to be a wireless controllable luminaire, is performed by determining, at the water-detection device 600, in this case integrated in luminaire 652, the signal-quality value of the RF wireless communication signals provided by the emitter unit of luminaire 656a. Thus, the RF-based water-sensing function is solely performed by the luminaires 656a and 652 while the target luminaire 654a is not participating actively. Optionally, the RF-based water sensing process aggregates the evaluation and comparison of other signal-quality values obtained from signals provided by other luminaires which follow a propagation path that crosses the target luminaire or luminaires.

In the exemplary lighting arrangement 650b of FIG. 6B, the luminaires 654b and 656b also include a respective water detection device 600 which has already determined and store respective baseline-values associated to the other luminaires in the baseline-condition. Whenever water accumulates in any one or more of the luminaries, such as luminaire 654b in FIG. 6B, this affects the signal-quality values in several ways. First, the RF wireless communication signals provided by luminaire 654b are affected by the water accumulated in the water-collection region. Also, the RF wireless communication signals received by the luminaire 654b are also affected by the accumulation of water. For example, in the situation depicted in FIG. 6B, the signal-quality values of the signals provided by luminaire 656b and received at luminaire 654b are outside the tolerance-range, which is an indication of water accumulation in a signal-propagation path between both luminaires. The same happens with the signal-quality values determined at luminaire 654b from the signals provided by luminaire 656b. In principle, in the case of having two luminaires, a determination of which specific luminaire is suffering from water-ingress is not straightforward. For this, a simple solution provided by the lighting arrangement 650b is to take into account the signal-quality values determined by other luminaires. For instance, the signal-quality values of the signals provided by luminaire 656b and received by luminaire 652 remain within the tolerance range. This result enables determining that water ingress has happened in luminaire 654b and not in luminaire 656b.

The lighting arrangement 650b also comprises a water-ingress control unit 658 that is configured to receive from the one or more water-detection devices 600 the respective water-detected signals indicative of the possible increase of the water amount in the respective signal-propagation path between the emitter unit and the receiver unit and to determine, using the water-detected signals, a likelihood of water-ingress in the respective luminaires and to provide a water-ingress signal indicative thereof, as explained above.

It is worth noting, that a decrease of the signal-quality value can be caused by other issues such as, for example, an object or subject crossing the signal-propagation path and absorbing or scattering part of the radiation energy. However, the time signature of these effects are different from that caused by water-accumulation.

Figure 7:
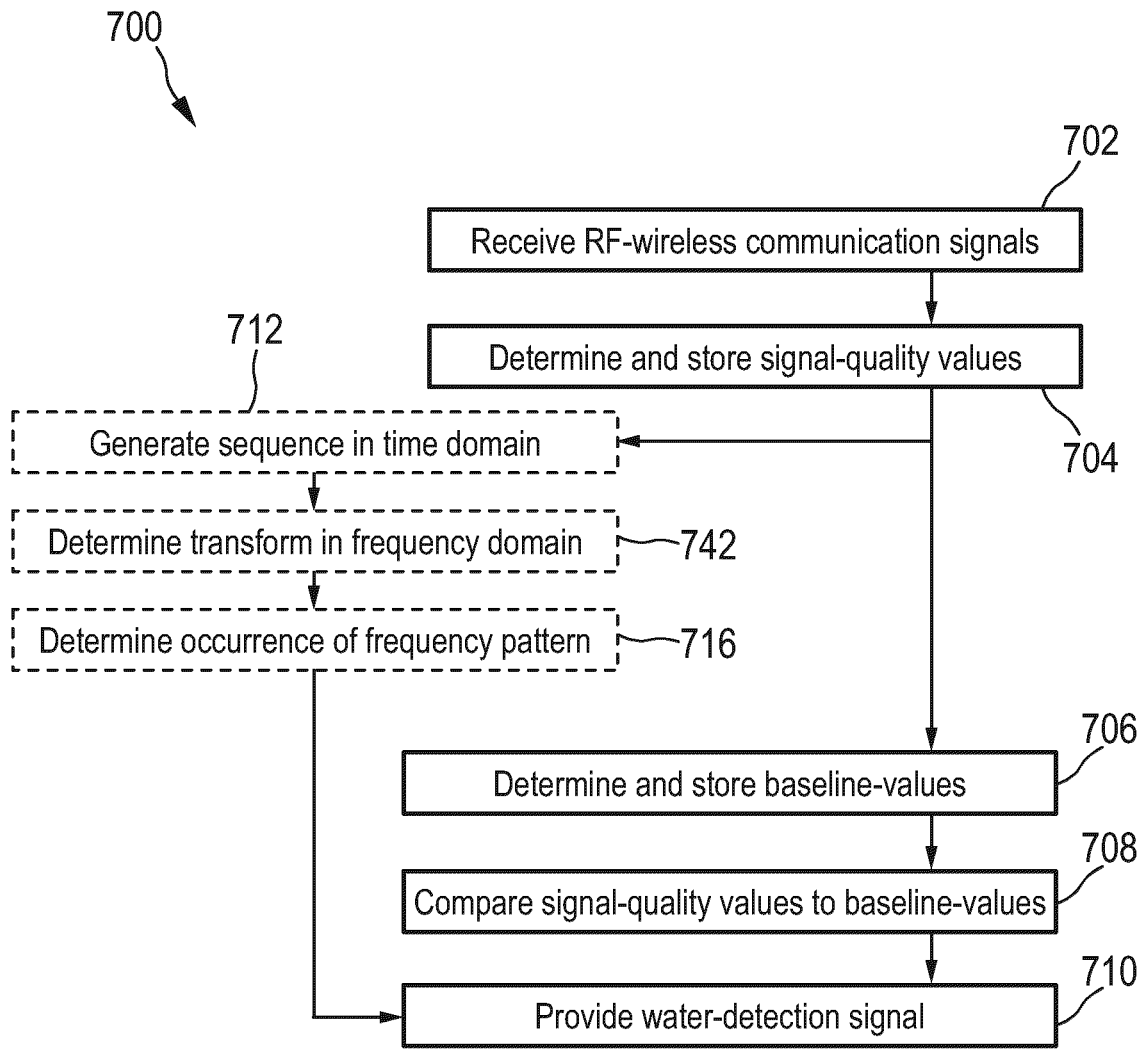
FIG. 7 shows a flow diagram of an embodiment of a method for operating a water-detection device.

FIG. 7 shows a flow diagram of an embodiment of a method 700 for operating a water-detection device. the method comprises, in a step 702, receiving radio-frequency wireless communication signals from at least one emitter unit in accordance with a predetermined wireless communication protocol. The method comprises, in a step 704, determining and storing respective signal-quality values, for instance indicative of a signal strength of the wireless communication signals or of a channel-state of a respective wireless communication link between the at least one emitter unit and the receiver unit, or of any other suitable signal-quality metric wherein the signal-quality value is correlated to an amount of water present in a signal-propagation path of the radio-frequency wireless communication signal. The method comprises, in a step 706, and in response to a reception of a trigger signal, determining and storing a respective baseline-value indicative of the signal-quality value obtained from the radio frequency wireless communication signal provided by the respective emitter unit. The method comprises, in a step 708 comparing the signal quality values with the corresponding baseline-value and, in a step 710 providing a respective water-detected signal upon determining that the respective signal-quality value has been outside the predetermined tolerance-range for at least a predetermined water-determination time span, the water-detected signal being indicative of a possible increase or decrease of the amount water content in the respective signal-propagation path with respect to the amount of water in the determination of the baseline-value.

Optionally, the method also comprises, in a step 712, generating, using the received signal-quality values, a respective sequence of signal-quality values in a time domain, in a step 714 determining a respective transform of the sequence of signal-quality values in a frequency domain and in a step 716, determining, in the transform of the sequence of signal-quality value, an occurrence of a predetermine frequency-pattern in a frequency band below 50 Hz. In this variant, the provision of the water-detected signal in performed in further dependence on the occurrence of the predetermined frequency pattern.

Figure 8:
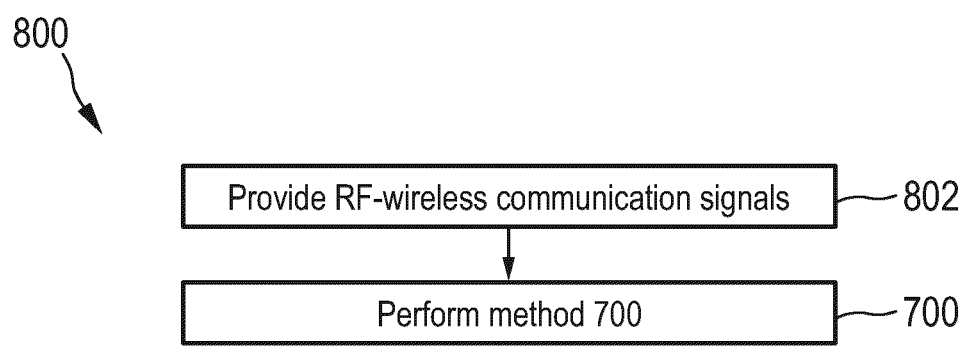
FIG. 8 shows a flow diagram of an embodiment of a method determining water-ingress in a wirelessly controllable luminaire of a lighting arrangement.

FIG. 8 shows a flow diagram of an embodiment of a method determining water-ingress in a wirelessly controllable luminaire of a lighting arrangement. The method comprises, in a step 802, providing radio-frequency wireless communication signals by an emitter unit of a first luminaire. The method further comprises performing, at a water-detection device external to the first luminaire, the method 700 of FIG. 7 in accordance with claim 11 or 12.

The method 800 of FIG. 8 can be advantageously adapted for determining water-ingress in a wirelessly controllable luminaire having an emitter unit, a receiver unit and a housing having a water-collection region positioned in a signal-propagation path between the emitter unit and the receiver unit. In this case, the method comprises providing, by the emitter unit of the luminaire, radio-frequency wireless communication signals, and performing the method 700 of FIG. 7.

In summary, the invention is directed to a water-detection device for detecting a change in an amount of water with respect to a baseline-condition. The water-detection device is configured to compare signal-quality values to baseline-values. The signal-quality values are indicative of a signal-quality metric that is correlated to the amount of water present in a signal-propagation path. The baseline-values are indicative of the signal-quality value obtained from the radio-frequency wireless communication signal at the baseline-condition. The water-detection device is configured to provide a water-detected signal indicative of a possible change of the amount water in the respective signal-propagation path upon determining that respective signal-quality value has been outside a tolerance-range of the baseline-value for a predetermined amount span, without the need of any dedicated water sensor.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A water-detection device for detecting a change in an amount of water in a gas phase or in a liquid phase, the water-detection device comprising:
   a receiver unit for receiving radio-frequency wireless communication signals from at least one external emitter unit in accordance with a predetermined wireless communication protocol;
   a signal-quality determination unit connected to the receiver unit and configured to determine and store respective signal-quality values associated to the at least one external emitter unit, wherein the signal-quality value is correlated to an amount of water present in a signal-propagation path between the at least one external emitter unit and the receiver unit;
   a baseline-value determination unit configured, in response to a reception of a trigger signal, to determine and to store a respective baseline-value indicative of the signal-quality value obtained from the radio-frequency wireless communication signal provided by the respective external emitter unit at a baseline-condition;
   a water-detection unit connected to the signal-quality determination unit and to the baseline-value determination unit and configured to compare the signal-quality values with the corresponding baseline-value, and to provide a respective water-detected signal upon determining that the respective signal-quality value has been outside a predetermined tolerance-range of the baseline-value for at least a predetermined water-determination time span, the water-detected signal being indicative of a possible change of the amount water in the respective signal-propagation path with respect to the amount of water in the baseline-condition.

2. The water-detection device of claim 1, wherein the receiver unit is configured to receive radio-frequency wireless communication signals with signal frequency values between 1 and 100 GHz.

3. The water-detection device of claim 1, wherein the water-detection unit further comprises a frequency-evaluation unit configured:
- to determine a respective transform in a frequency domain of a sequence of received signal-quality values; and
- to determine, in the transform of the sequence of signal-quality values, an occurrence of a predetermined frequency-pattern in a frequency band below 50 Hz; and wherein the water-detection unit is configured to provide the water-detected signal in further dependence on the occurrence of the predetermined frequency pattern.

4. A wirelessly controllable luminaire comprising:
- a lighting unit, configured to receive electrical power and to emit light for illumination in dependence on operation instructions received via radio-frequency wireless communication signals;
- the at least one external emitter unit for providing radio-frequency wireless communication signals for communication;
- a housing having a water-collection region for collecting water inside the luminaire due to water ingress in the luminaire; and
- the water-detection device according to claim 1.

5. The wirelessly controllable luminaire of claim of claim 4, wherein the water-collection region is positioned in a signal-propagation path of the wireless communication signals provided by the at least one external emitter unit and received by the receiver unit.

6. A lighting arrangement configured to detect water-ingress within luminaires, the lighting arrangement comprising:
- a plurality of wirelessly controllable luminaires configured to receive and provide radio-frequency wireless communication signals for communication with other devices of the lighting arrangement in accordance with a predetermined communication protocol; and
- at least one of the water-detection device of claim 1.

7. The lighting arrangement of claim 6, wherein the at least one external emitter unit is configured to provide water-sensing specific radio-frequency wireless communication signals having a higher frequency value range than radio-frequency wireless communication signals used for operating the lighting arrangement.

8. The lighting arrangement of claim 6, further comprising a water-ingress control unit that is configured:
- to receive from the one or more water-detection devices the respective water-detected signals indicative of a possible increase of the water amount in the respective signal-propagation path between the at least one external emitter unit and the receiver unit; and
- to determine, using the water-detected signals, a likelihood of water-ingress in the respective luminaires and to provide a water-ingress signal indicative thereof.

9. The water-detection device of claim 1, wherein the baseline-condition comprises a dry condition.

10. The water-detection device of claim 1, wherein the baseline-condition comprises a normal operation condition.

11. A method for operating a water-detection device, the method comprising:
- receiving radio-frequency wireless communication signals from at least one emitter unit in accordance with a predetermined wireless communication protocol;
- determining and storing respective signal-quality values, wherein the signal-quality value is correlated to an amount of water present in a signal-propagation path of the radio-frequency wireless communication signal;
- in response to a reception of a trigger signal, determining and storing a respective baseline-value indicative of the signal-quality value obtained from the radio frequency wireless communication signal provided by the respective emitter unit;
- comparing the signal quality values with the corresponding baseline-value;
- providing a respective water-detected signal upon determining that the respective signal-quality value has been outside a predetermined tolerance-range of the baseline-value amount for at least a predetermined water-determination time span, the water-detected signal being indicative of a possible change of the amount water in the respective signal-propagation path with respect to the amount of water in a baseline-condition.

12. The method of claim 11, further comprising:
- determining a respective transform in a frequency domain of a sequence of received signal-quality values;
- determining, in the transform of the sequence of signal-quality value, an occurrence of a predetermine frequency-pattern in a frequency band below 50 Hz; and
- providing the water-detected signal in further dependence on the occurrence of the predetermined frequency pattern.

13. A method for determining water-ingress in a wirelessly controllable luminaire of a lighting arrangement, the method comprising:
- providing radio-frequency wireless communication signals by the at least one an emitter unit of a first luminaire;
- performing, at the water-detection device external to the first luminaire, the method of claim 11.

14. A method for determining water-ingress in a wirelessly controllable luminaire having the at least one emitter unit, a receiver unit and a housing having a water-collection region positioned in a signal-propagation path between the at least one emitter unit and the receiver unit, the method comprising:
- providing, by the at least one emitter unit of the luminaire, radio-frequency wireless communication signals; and
- performing the method of claim 11.

15. A non-transitory computer-readable medium on which are stored a plurality of non-transitory computer-readable instructions that when executed on a processor are configured to perform the steps comprising the method of claim 11.

16. The method of claim 11, wherein the baseline-condition comprises a dry condition.

* * * * *